United States Patent Office 3,245,209
Patented Apr. 12, 1966

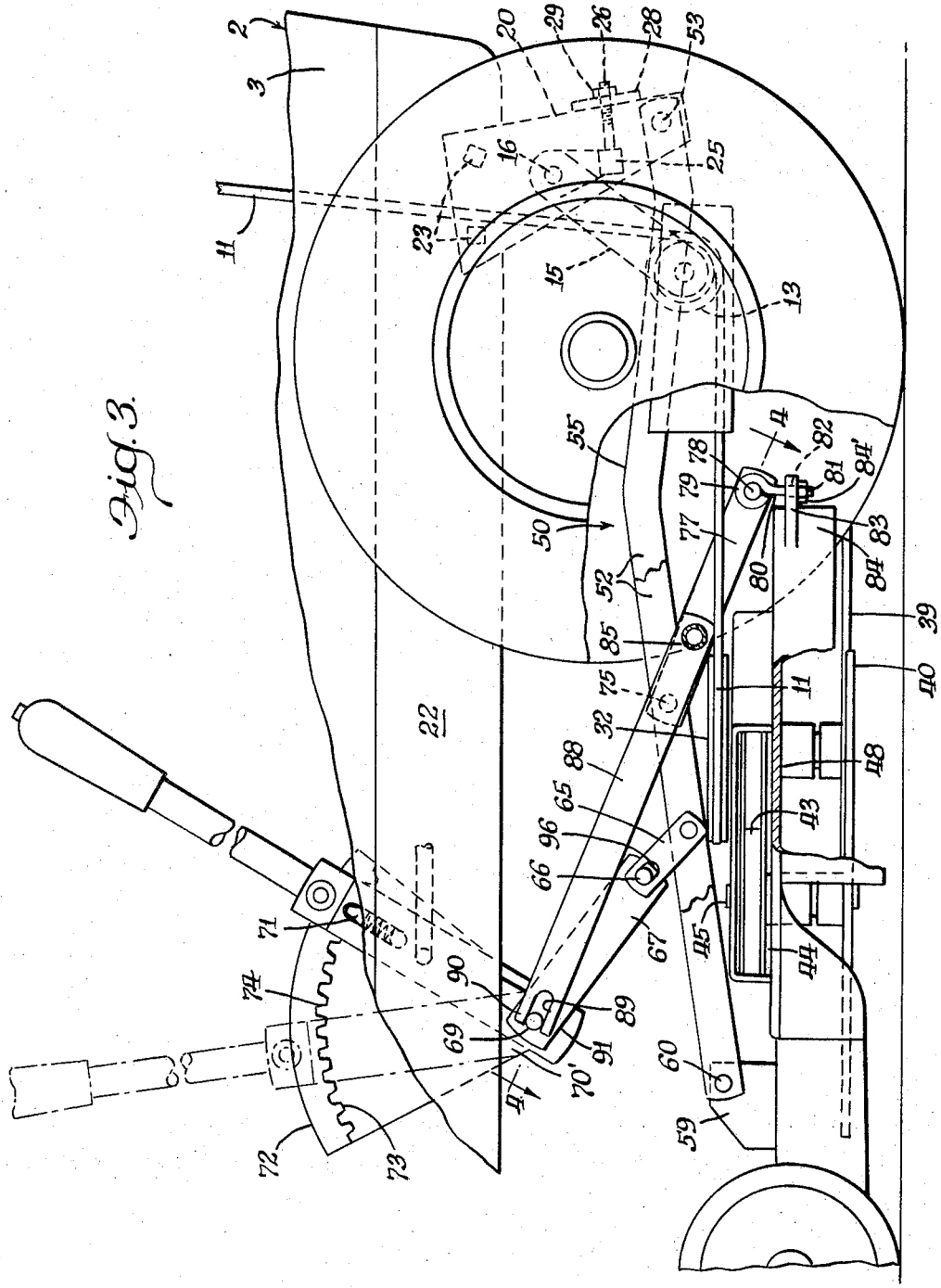

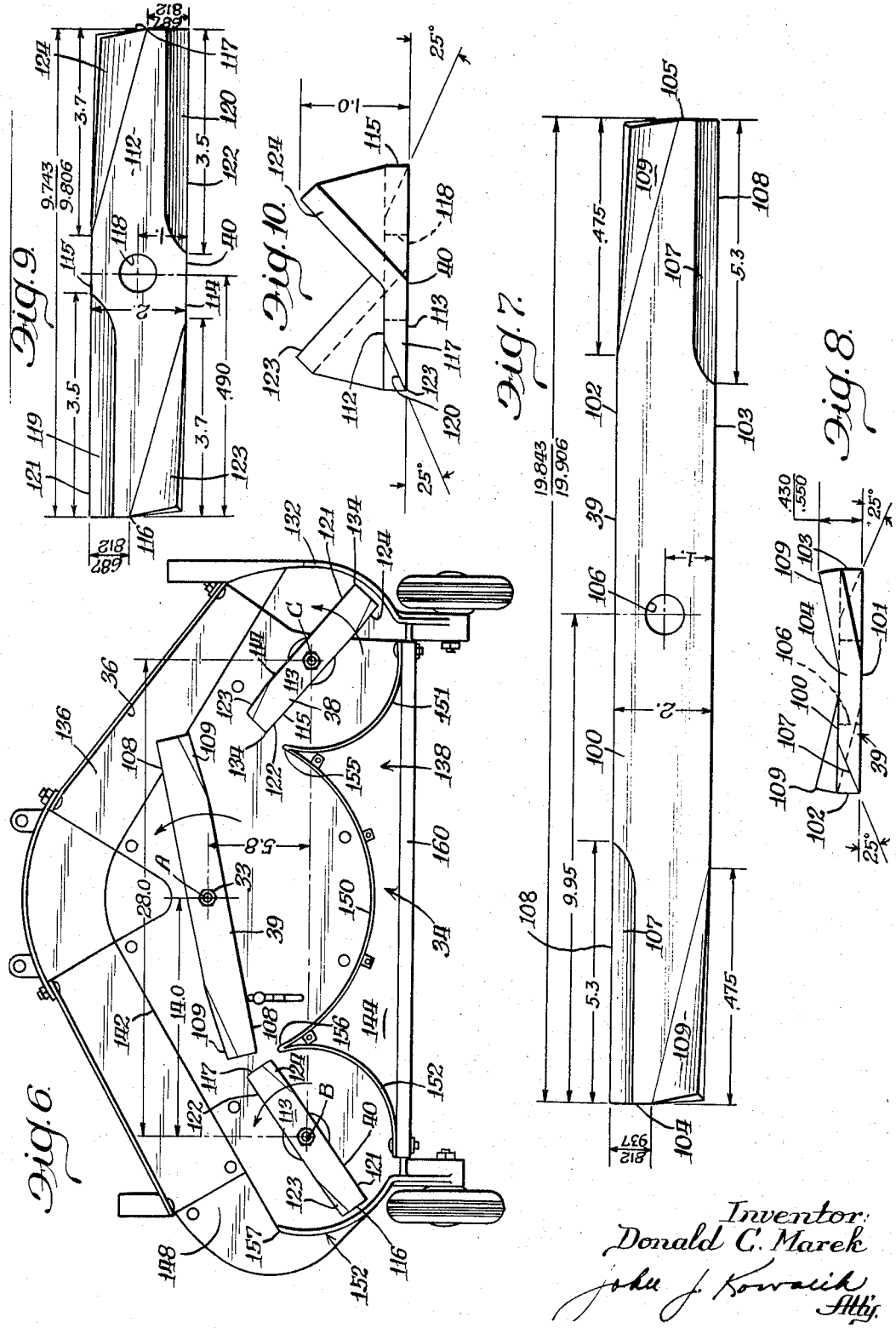

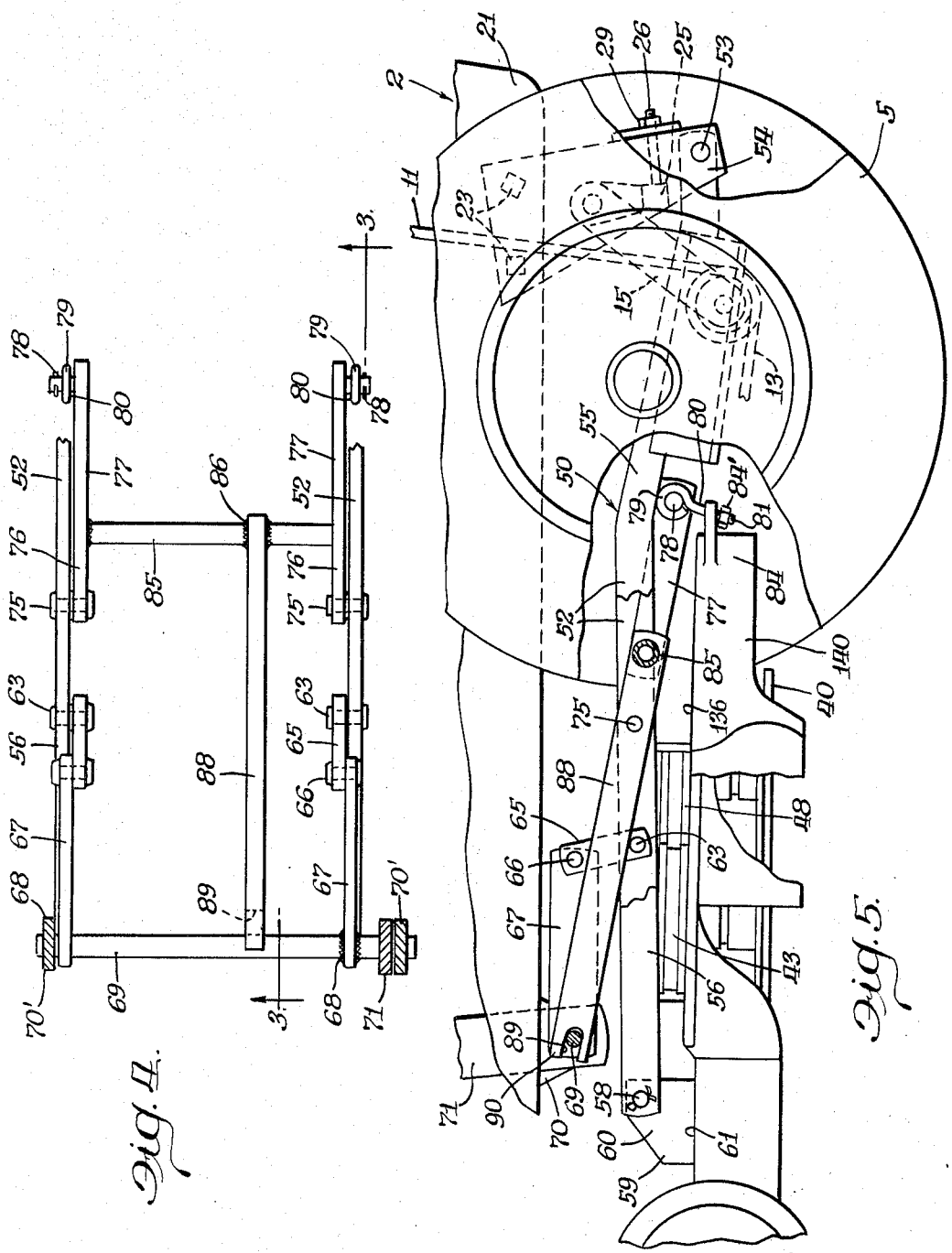

3,245,209
ROTARY MOWER WITH MEANS PROVIDING SELECTIVE SUCTION FOR ITS BLADES
Donald C. Marek, Hickory Hills, Ill., assignor to International Harvester Company, Chicago, Ill., a corporation of New Jersey
Filed Nov. 20, 1964, Ser. No. 412,712
5 Claims. (Cl. 56—25.4)

This invention relates to a mower with a novel arrangement of blades providing lifting suction for material to be cut and discharging the material.

A mower mounted from a tractor behind its front wheels usually cannot cut the material tracked down by the wheels. This is particularly true where the grass is damp and in being trampled does not spring up.

A general object of the invention is to provide a novel mower, which provides a good suction over the trampled material to lift it for cutting.

A further object of the invention is to provide a mower having a novel construction of cutting blades and arrangement thereof to not only lift the material but to aid in its flow through the mower.

Another object of the invention is to provide a mower and linkage therefor for supporting it from a tractor behind the front wheels thereof, such that the mower is elevated and lowered for different cutting heights generally parallel with the ground whereby the relationship of the blades to the tracks developed by the front wheels is maintained and the air flow developed by the blades is substantally constant in all positions of the mower.

A more specific object of the invention is to devise a mower having three cutting blades, rotatable about substantially vertical axes arranged in the form of an isosceles triangle with one apex of the triangle disposed forwardly and about which the largest blade is rotatable, there being two smaller blades with their axes located at the apices of the triangle disposed rearwardly and laterally of the first-mentioned apex, the smaller blades having peripheral paths overlapping in a fore-and-aft direction with the peripheral path of the larger blade, and the smaller blades being formed to provide substantially more suction than the large blade and being disposed in fore-and-aft alignment with the front wheels of the tractor for operation directly over the tracked material to forcibly lift the same.

A further object of the invention is to devise a novel arrangement of blades, such as will lift the tracked material by the wheel supports ahead of the mower, the housing and blades being so constructed as to obtain an air flow which will not frustrate the lifting action of the blades and will promote the outflow of the cut material from the housing.

These and other objects and advantages of the invention will be come more readily apparent from the specification and the drawings wherein:

FIGURE 3 is a fragmentary enlarged side elevational view of the structure in lowered position and partly in vertical section taken substantially on the line 3—3 of FIGURE 4;

FIGURE 4 is a view taken substantially on the line 4—4 of FIGURE 3;

FIGURE 5 is a side elevational view similar to FIGURE 3 showing the parts in elevated position;

FIGURE 6 is a bottom view of the novel mower;

FIGURE 7 is a top view of center blade;

FIGURE 8 is an end view thereof;

FIGURE 9 is a top plan view of one of the end blades; and

Figure 1:
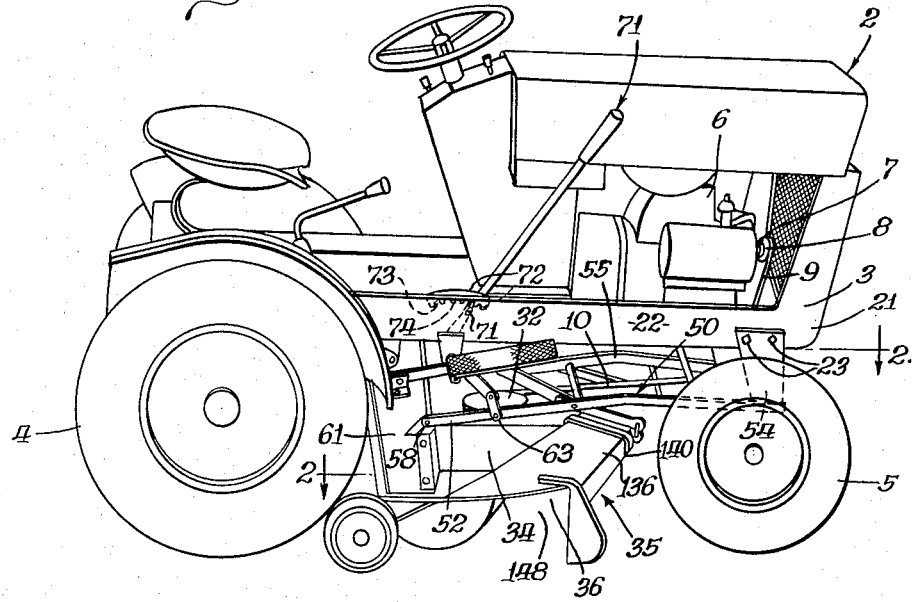
FIGURE 1 is a side perspective view of the mower and mounting therefor from an associated tractor.
Figure 2:
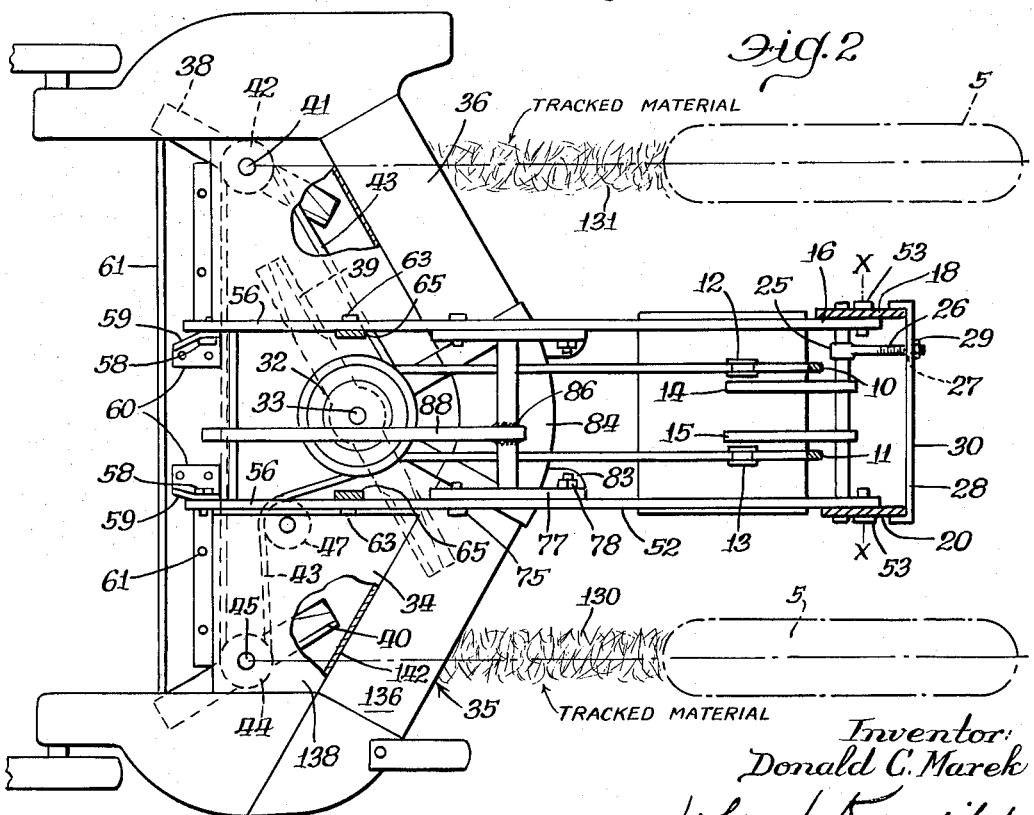
FIGURE 2 is an enlarged plan view of the mower and mounting linkage in section taken substantially on the line 2—2 of FIGURE 1.

FIGURE 10 being an end view thereof.

Referring to the drawings, there is shown a tractor generally designated 2 which comprises a longitudinal body 3, rear traction wheels 4 and front supporting and steering wheels 5. The tractor engine 6, mounted in body 3, provides a forward output shaft 7 with a pulley 8 about which is trained the driving belt 9, said belt having advance and return runs 10 and 11, the advance run 10 being passed under a tightener and guide pulley 12 and the return run 11 being disposed under a similar pulley 13. The pulleys 12 and 13 are carried respectively on arms 14, 15 which are supported on a shaft 16, said shaft 16 being pivotally mounted on and between a pair of anchor plates 18 and 20 which at their upper ends straddle the lower front end portion 21 of the body 3 of the tractor and are connected to the side sills 22 thereof as by bolts 23. The shaft 16 is connected to an adjusting arm 25 which is connected to a bolt 26, said bolt 26 being passed through an aperture 27 in a spanner plate 28 which interconnects the anchor members 18 and 20. The outer end of the bolt 26 is threaded and there is provided a nut 29 which reacts against the forward side 30 of the brace 28 and thereby effects adjustment of the pulleys 12 and 13 in order to attain the proper tension of the belt. It will be observed that the drive arrangement to the belt is in the nature commonly referred to in the art as a mule drive and that the belt proceeds with its advance run 10 rearwardly beneath the tractor body and is wrapped around the back side of a pulley 32 which is connected to a vertical spindle 33 suitably journalled from the top of the housing 34 of the mower generally designated 35. The return run of the belt extends generally parallel to the advance run in a substantially horizontal plane and proceeds forwardly from the pulley 32 beneath the idler 13 and back to the driving pulley 8.

The mower generally designated 35 is somewhat V-shaped in plan and comprises the aforementioned housing 34 which has a forward portion providing a tunnel structure 36 within which the grass or vegetation clippings are adapted to be channelled, that is from the leftward mower blade 38 to the center mower blade 39 and thereby to the rightward mower blade 40. It will be seen that the blades 38, 39 and 40 are arranged in a somewhat triangular pattern and that the blade 38 is carried by vertical shaft 41 which is suitably journalled from the top of the housing, the shaft 41 being connected to a pulley 42 which is driven by a belt 43, said belt 43 having its rear run 44 extending from the pulley 42 to the pulley 44 which is connected to the vertical spindle 45, the spindle 45 being suitably journalled from the housing 34 and being connected to the mower blade 40. The forward run 46 of the belt 43 extends from the forward side of the pulley 44 around the back side of an adjustable idler pulley 47 mounted on housing 34 and then proceeds around the forward side of pulley 48 which is connected to the shaft 33 which drives the center rotor 39. The forward run of the belt 43 then proceeds to and around the forward and outer side of the pulley 42 whence it continues as the rear run 44 of the belt. Thus it will be seen that the drive from the belt is in a substantially horizontal plane to the middle pulley 32 which is mounted on a substantially vertical axis.

The mower is suspended from the tractor by a novel support linkage generally designated 50 which comprises a pair of laterally displaced substantially horizontally extending combination lift and draft arms 52, 52 which at their forward ends are pivoted as at 53 to the lower ends 54 of the anchor elements 18 and 20. The draft arms are bowed upwardly intermediate their ends as at 55 in order to clear the deck of the mower over which the rear end portions 56 of the arms 52 extend. The rear ends of the arms 52 are pivoted on pins 58, on a substantially horizontal axis generally parallel to the axis of the pivotal mountings at 53, to the upright ears 59 of the bracket member 60 which are secured to the rear deck portion 61 of the mower. Thus, the rear end portion 61 of the mower is swingable upwardly and downwardly about the pivot axis indicated X—X as represented by the pins 53, and a long pivot arm is provided to the mower so that the mower swings in an extremely shallow vertical arc whereby the position or locus of the spindle 33 at its uppermost and lowermost positions is substantially the same and its movement fore-and-aft is extremely minimal and within the stretch limit of the belt so that proper tension is maintained in the drive belt in all positions of the mower.

The draft arms are pivotally connected on a substantially horizontal axis by means of pins 63, 63 at their rear portions 56 to the lower ends of lifting links 65, 65, said links 65 having their upper ends pivotally connected on a substantially horizontal axis as by pins 66, 66 to the forward ends of lift arms 67, 67 which at their rear ends are connected as at 68, 68 to a pivot or rockshaft 69 which is mounted on brackets 70 suitably connected to the side sills 22 of the tractor. The shaft 69 is connected to an upstanding lever 70 which incorporates a spring-loaded latch 71 operating within a quadrant 72 which is carried from the side sill of the tractor, said quadrant 72 having a toothed sector 73 which selectively receives the latch lug 71 into any of the notches 74 for holding the linkage against movement as the mower is set in certain selected positions.

The main lift arms or drag links 52, 52 are connected at the forward ends of the rear portions 56 by means of pins 75, 75 to the upper rear ends 76, 76 of the forward lift links 77, 77, said lift links 77 being provided with pivot pins 78 at their forward lower ends and provide pivotal connections for the upper eye ends 79 of the eyebolts 80 which have their lower bolt ends 81 extending through enlarged apertures 82 in forwardly projecting ears 83 which are integral and extend forwardly from the front apex piece 84 of the mower housing. The lower ends of the bolts 81 are provided with self-locking nuts 84′ which are underposed with respect to the respective ears 83 and which with the loose openings 82 serve as universal connections to the forward ends of the forward lifting links 77. The lifting links 77 are rigidly interconnected intermediate their ends by a torsion bar 85 which is fixedly connected, as by welding as at 86, intermediate the links 77 to the forward lower end of a compensating bar or arm 88, said compensating bar having a longitudinal slot 89 in the rear end thereof defined by upper and lower furcations 90, 91 which embrace the pivot or rockshaft 69. Thus, the rear end of the compensating link has a sliding pivotal or lost-motion pivotal connection on an axis which is fixed with respect to the tractor. The geometry of the compensating linkage and the points of connections of the forward links 77 with respect to the points of connection 60 of the main lifting arm 62 to the rear portion of the tractor by means of the brackets 59 is so chosen that the forward end of the mower lifts at substantially the same rate as the rear end and moves in a minimal arc about the forward axis of pivot 53 of the main lifting arms.

Thus, the mower moves substantially vertically and disposes the blades generally horizontally in all positions of the mower without excessively swinging the mower so as to loosen or excessively tighten the belt in different positions of the mower.

The mower rear portion 61 is provided at opposite ends of the mower with rearwardly extended gauge wheels 95, 95 which serve to support the rear end of the mower when upon the ground and it will be seen that the links 65 have elongated slots 96 which permits the mower to float with the arms 52 pivoting about axis 53. The float of the forward end of the mower has been previously explained and additional float obtains through pivot of the compensating linkage.

An efficient lifting system is provided such that the load is applied to the rear end of the mower, thereby the mower is adapted to drive with its front end over obstructions since it has limited vertical movement with respect to the supports at the forward end of the mower, namely, the bolts 81.

A feature of the present invention is in providing blade structures and an arrangement thereof, such as will efficiently lift the crop material and provide an efficient flow of air through the housing to effect an efficient cut of material and movement thereof without plugging under normal operating circumstances within the capacity of the mower.

This is accomplished in placing the front mower blade on the axis A and the lateral rear blades on the axes B, C, said axes arranged in the form of an isosceles triangle.

The lengths and dimensions of the blades and their dispositions relative to each other are indicated on the drawings.

It will be observed that the blades 38, 40 are identical and that the larger blade 39 has an entirely different cross section than the smaller end blades 38, 40.

The blade 39 is of rectangular cross-section having substantially flat top and bottom sides 100, 101 and generally flat lateral edges 102, 103 and flat ends 104, 105. The blade 39 is generally rectangular in plan and is apertured centrally thereof at 106 to provide a mounting therefor on the spindle 33. The blade 39 is beveled at each end at 107, 107 to provide sharpened cutting edges 108, 108. The trailing portions of the blade with respect to the cutting edges have triangular portions 109 bent upwardly to provide fan structures or wings for the purpose of creating an updraft of air to raise or lift the material to be cut and to move the material laterally of the mower through the tunnel. The dimensions and the angle of each wing to the plane of the blade is indicated on the drawings.

Each end blade 38, 40 comprises a generally rectangular structure in plan and is an elongated member rectangular in cross-section having upper and lower surfaces 112, 113, generally flat lateral edges 114, 115 and flat ends 116, 117.

The blades 38, 40, are apertured centrally at 118 for mounting on the associated spindles. The ends of each blade 38, 40 are beveled at their lateral edges as at 119, 120 to provide cutting edges 121, 122. Rearwardly of the respective cutting edges, the blades have triangular portions 123, 124 which are angled upwardly from the plane of the blade as indicated.

It will be realized that the wings 123, 124 are so constructed as to provide a substantially greater suction on the grass therebeneath than wings 109 on the center blades in relation to their speed of operation.

As an example in a 38 inch mower, the center blade has a spindle speed of 2330 revolutions per minute and a tip speed of 12000 feet per minute while the end blades have a spindle speed of 5820 r.p.m. and a tip speed of 15,000 ft. per minute. The relationship is such that blades 38 and 40 develop updrafts of air to lift the material in the tracks 130, 131. The air from blade 38 is channelled leftwardly, as seen in FIGURE 6, within the confinement developed by the arcuate peripheral closure wall 132 which is generally concentric with the path of the tips 134 of the blade 38.

Blade 38 has a cutting sector within the tunnel 36. The tunnel is developed by an upwardly offset forward portion 136 of the top wall 138 of the housing 34 and a peripheral front wall 140 depending from portion 136 and a vertical rear wall 142 of the tunnel, wall 142 merging with the forward edge of a generally horizontal rear wall portion 144 (FIG. 6) of the housing 34. Wall 144 is disposed in close proximity to the horizontal plane of rotation of the mower blades.

The peripheral wall portion 132 merges into the adjacent end of wall 140 and closes the rightward end (FIG. 6) of the tunnel 36 whereby the uplifting air developed by blade 38 is guided leftwardly through the tunnel entraining the grass clippings. This material and that cut by the center rotor which has minimal or reduced fanning action with respect to the end blades is then delivered leftwardly (FIG. 6), by the center blade having a cutting sector passing through the tunnel to the leftward rotor which discharges the large volume of air cumulative from rotors 38 and 39 and that developed by rotor 40 through the discharge opening 148 to forcibly eject the material from the mower.

The rotors 38, 39 and 40 are encased rearwardly of the respective axes of rotation by arcuate guides and material confining flanges which are secured to and depend from the rear portion 138 of the housing 34. These confining guides or air flow directing means 150, 151 and 152 are concentric with the respective axes A, B, and C and are in close proximity to the tip ends of the respective blades. They serve to confine the material and the air developed by the respective blades. The guides 150, 151 merge into a cut-off apex 155 for preventing recirculation of any material beneath the blade 38 and guides 150, 152 merge into an apex 156 to provide a cut-off to prevent recirculation of material by the blade 39. The guide 152 terminates in a cut-off edge 157 behind the exit opening 148. The dependent flange 160 along the rear edge of the housing 34 serves as an additional baffle for stones and material.

It has been found that the foregoing specifications provide an adequate and efficient mower structure. In a 42 inch mower, that is, one which will cut 42", the center blade 39 has a cutting circle of 22 inches and has a tip speed of 13400 ft. per minute and the smaller blades cut a 10.7 inch circle and have tip speeds of 16300 feet per minute. The dimension of the wings and cutting edges is the same as in the previous embodiment.

I claim:
1. The combination of a tractor having wheels and a mower supported from the tractor behind the wheels whereby the wheels track and depress ahead of the mower material to be cut thereby, said mower having a housing including an upper portion having a laterally extending clipping tunnel and three cutters rotatably mounted within the housing and including a center cutter and end cutters, each having a blade rotatable in a generally horizontal plane, said end cutters disposed in fore-and-aft alignment with the wheels developing said tracks, and suction-creating means on the blades of each cutter providing a flow of air lifting the crops to be cut, and means on said end cutters of the order developing greater upward suction than the center cutter.

2. The invention according to claim 1 and said means for directing air current comprising arcuate flanges about each blade and concentric therewith and depending from the top of the housing and partially surrounding each blade and each having an area open to the tunnel.

3. The invention according to claim 2 and each blade rotatable in the same direction and means closing the tunnel at an end opposite to the direction of rotation.

4. In a mower having a housing including a top and a transverse material-clippings tunnel therebeneath having a closed end at one side of the mower and an open discharge end at the opposite side of the mower, means supporting the mower extending thereahead and operative to depress the material to be cut into the ground, a pair of end blades and an intermediate blade disposed in a common substantially horizontal plane and rotatable about vertical axes beneath the top and each having a path of travel including a cutting sector within the tunnel, means for rotating said blades in the same direction with the blades moving in the tunnel from the closed end to the open end thereof, said end blades being substantially in vertical alignment with the areas of said depressed material and having means for lifting the material to a cutting height substantially that of the standing material, said last-mentioned means comprising fan means developing air currents at opposite sides of the intermediate blade of the order creating upward suction greater than that created by the intermediate blade, and means on the housing for directing such currents into said tunnel, said intermediate blade oriented to fan the material in the tunnel with the entraining air currents from the end blade at the closed end of the tunnel to the end blade at the open end of the tunnel concurrently with the intermediate blade cutting the material therebeneath.

5. In a rotary mower having a housing with a top including a vegetation-clippings tunnel extending transversely of the direction of travel, said tunnel arranged in a form of a V having a forwardly directed apex, means supporting the mower and including ground-engaging structure ahead of the mower operative to develop tracks and depress the material toward the ground ahead of the mower in the cutting area thereof, a forward cutting blade centered with respect to said apex and laterally flanking end blades disposed rearwardly of the cutting blade, all of said blades rotatably mounted from the housing on generally vertical axes and being disposed in a generally common horizontal plane and each projecting into the tunnel, and said end blades being smaller than the forward blade, said end blades and forward blade having wing means, the wing means on the end blades being upturned relative to the horizontal to a greater degree than the wing means on the center blade to provide greater suction on the material by the end blades than the forward blade so as to lift the depressed material.

References Cited by the Examiner
UNITED STATES PATENTS

| | | | |
|---|---|---|---|
| 2,898,723 | 8/1959 | Goodall | 56—25.4 |
| 3,077,065 | 2/1963 | Samways et al. | 56—25.4 |

ANTONIO F. GUIDA, *Acting Primary Examiner.*
ABRAHAM G. STONE, *Examiner.*
M. C. PAYDEN, R. R. KINSEY, *Assistant Examiners.*